June 5, 1951 C. J. COOK 2,555,919
VEHICLE BRAKE OPERATING MECHANISM
Filed June 2, 1947 2 Sheets-Sheet 1

INVENTOR.
Charles J. Cook.
BY
Harness, Dickey & Pierce.
ATTORNEYS.

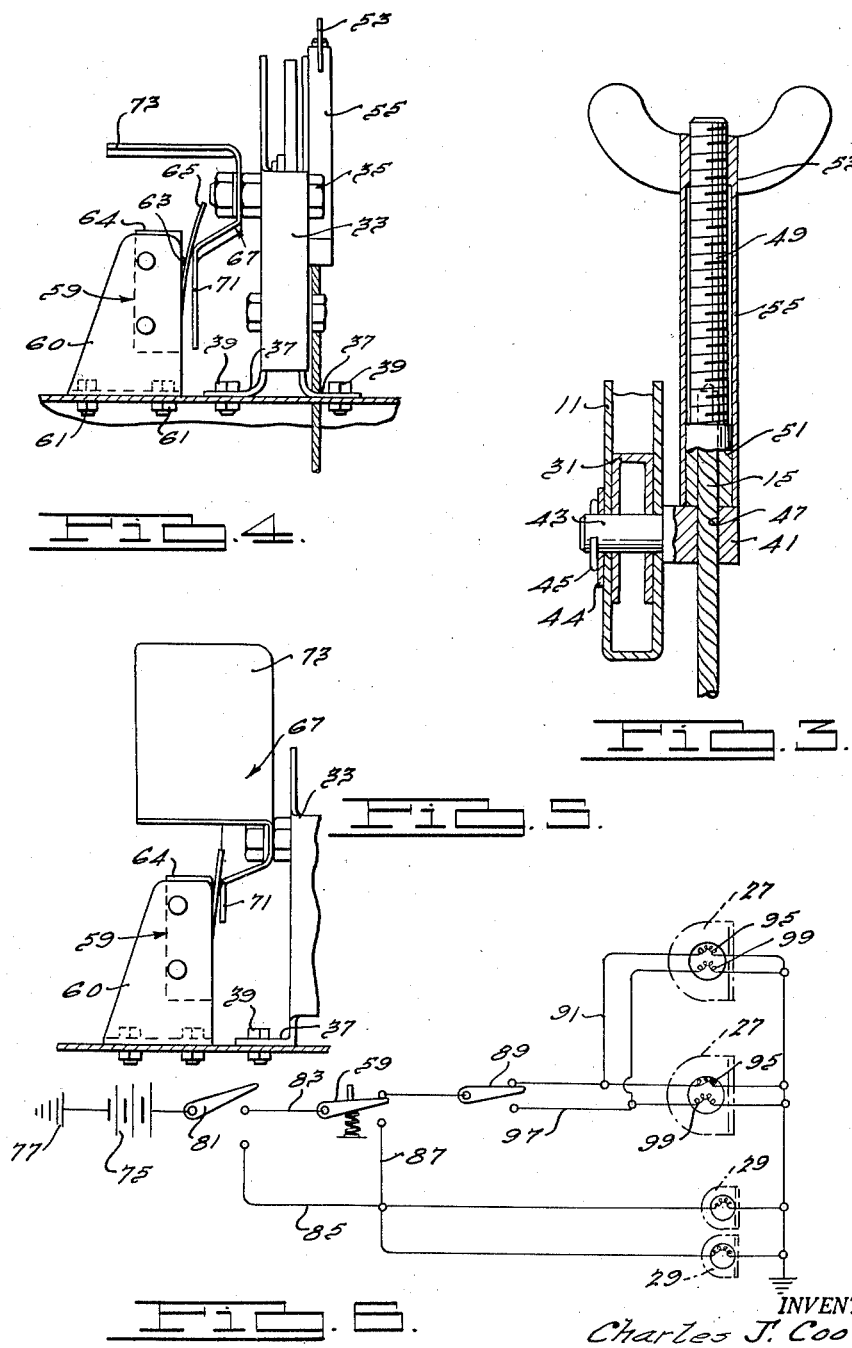

Patented June 5, 1951

2,555,919

UNITED STATES PATENT OFFICE 2,555,919

VEHICLE BRAKE OPERATING MECHANISM

Charles J. Cook, East Lansing, Mich., assignor to Reo Motors, Inc., Lansing, Mich., a corporation of Michigan Application June 2, 1947, Serial No. 751,933

2 Claims. (Cl. 74—501)

This invention relates generally to motor vehicles and more particularly to vehicles which, when in use, are constantly and alternately moved a short distance and parked, such as the type of vehicle used for delivering merchandise from building to building.

Delivery trucks such as the type used to deliver milk from house to house are constantly being parked while the operator delivers the merchandise, and then driven only a short distance, parked again, etc. In these types of delivery trucks, it is necessary to have a hand-operated brake for preventing movement of the vehicle, when it is parked. As this brake is constantly being applied and released, it is desirable to provide a hand-brake lever which is located in an especially convenient place so that the vehicle operator can quickly and easily grasp the same. Likewise, in vehicles of this type the brake mechanism wears faster than that of an ordinary vehicle brake mechanism. It is therefore desirable to provide means for adjusting the brake mechanism, which means is located within the driving compartment of the vehicle, so as to eliminate the necessity of crawling underneath the vehicle in order to adjust the brake mechanism, as is now the common practice.

Delivery trucks, of the type which are used for delivering milk, are often in use at night, when the driving lights of the vehicle must be on. Therefore, as these vehicles are parked as much as, if not more than, they are actually driven, the driving lights of the vehicle tend to run down the vehicle battery. The operator of such vehicle, who is constantly making deliveries, will not ordinarily reach forward to manually operate the light switch, so as to shut out the driving lights and turn on the parking lights. It is therefore desirable to provide means for automatically shutting off the driving lights and applying the parking lights when the motor vehicle is in a parked position.

The principal objects of this invention are therefore to provide a hand-brake lever for a vehicle, of the type described, which is mounted adjacent the driver's seat so that it may be easily reached and actuated by the vehicle operator; to provide brake-adjusting means, located within the compartment of the vehicle, which may be adjusted to compensate for wear of the brake mechanism; to provide switch means which, when the hand brake is applied, will automatically shut off the driving lights of the vehicle and turn on the parking lights, and which, when the hand brake is released, will automatically turn the driving lights on and turn off the parking lights.

These and other objects of this invention will become apparent from the following detailed description taken in conjunction with the accompanying drawings in which:

Fig. 3 is an enlarged sectional view of the structure illustrated in Fig. 2 taken along the lines 3—3 thereof;

Fig. 4 is a front elevational view of the structure illustrated in Fig. 2 taken along the lines 4—4 thereof, and illustrating the hand-brake lever in a released position;

Fig. 5 is a front elevational view, similar to Fig. 4, illustrating the hand-brake lever in an applied position; and Fig. 6 is a diagrammatic view of the electrical circuits for the driving and parking lights of the vehicle.

Figure 1:
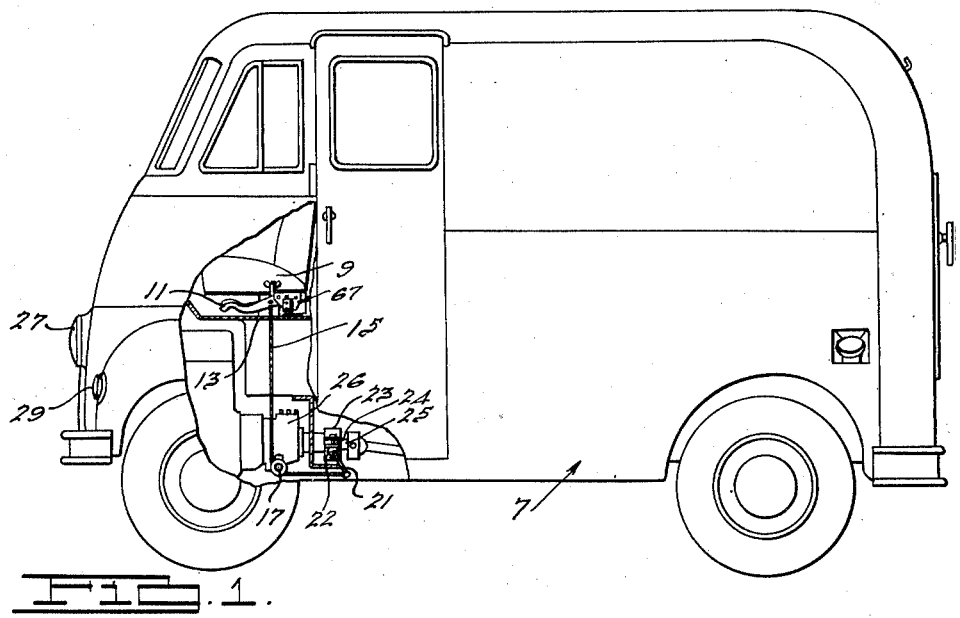
Figure 1 is a partially broken-away side elevational view of a motor vehicle employing this invention.
Figure 2:
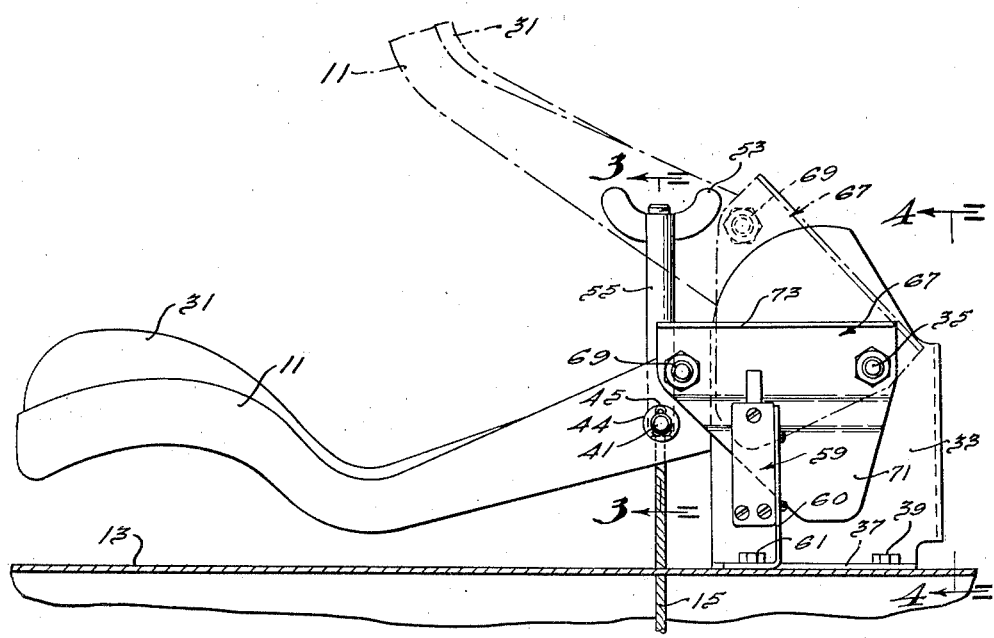
Fig. 2 is an enlarged side elevational view of the hand-brake lever mechanism of this invention.

Referring now to the drawings, it will be seen that a motor vehicle of the delivery-truck type is generally indicated at 7. A pivotally mounted driver's seat 9, of a conventional type, is provided in the driver's compartment adjacent the forward end of the vehicle. A hand-brake lever 11 is mounted in a horizontal plane, as will be hereinafter described in detail, on a wheel housing 13, and adjacent the driver's seat 9. The hand-brake lever 11 is operatively connected to a cable 15 which extends downwardly from the lever and around a pulley 17 suitably mounted for rotation about an axis fixed on the vehicle. The cable may be connected to any suitable type or form of brake mechanism for the vehicle wheels or on the propeller shaft. The latter is illustrated in the drawings for purposes of simplicity of description. As illustrated in Fig. 1, the cable extends rearwardly from the pulley, in a substantially horizontal plane, and the rear end thereof is connected to an arm 21, which has a cam element 22 mounted on the upper end thereof. The cam 22 is operatively connected to a brake band 23 which surrounds a conventional brake drum 24 fixed to the main transmission shaft 25 at the rear end of the transmission 26, in a conventional manner. Therefore, when the hand-brake lever 11 is pulled upwardly, the brake band 23 will be caused to frictionally engage the propeller shaft 25 and hold the vehicle against movement. Driving lights 27 and parking lights 29 are conventionally mounted in the front end of the vehicle.

The hand-brake lever 11 is a generally commercial type, and is, in transverse cross section, of an inverted U shape. A release handle 31 is pivotally mounted within the lever 11 so that when the lever is pulled upwardly to apply the brake, it will be held in the applied position until the release handle 31 is squeezed by the vehicle operator, whereupon the lever will return to its normal down position. The rear end of the break lever 11 is pivotally mounted on a bracket 33, by means of a bolt 35. The bracket 33 is generally U shaped, in transverse cross section, and receives the rear end of the brake handle 11 between the side walls thereof. The bracket 33 is formed with outturned flanges 37, on the lower end of each side wall, which are rigidly connected to the vehicle wheel housing 13 by means of bolts 39.

Forwardly of the bracket 33, the upper end of the cable 15 is connected to the lever 11. This is accomplished by means of a T-headed pin 41. The shank portion 43 of the pin passes transversely through the lever 11 and release handle 31, so that the head of the pin 41 abuts the inner side of the handle. A washer 44 is inserted on the outer end of the pin 41, and a cotter pin 45 is inserted through an aperture adjacent the end of the pin, to rotatably secure the pin 41 in the lever 11. The head portion of the pin 41 is provided with a vertical aperture 47, through which the upper end of the cable 15 passes. A screw 49, having a cylindrical head 51, of only a slightly larger diameter than the screw, is disposed above the head portion of the pin 41. The cable 15 is fixedly connected in the head 51 of the screw 49 in any suitable manner. A wing nut 53, having an elongated depending sleeve portion 55, is threaded onto the upper end of the screw 49 so that the bottom of the sleeve portion 55 abuts against the head of the pin 41. Therefore, by turning the nut 53, the screw 49 and the cable will be drawn upwardly to shorten the effective length of the cable 15 between the levers 11 and 21, thereby to compensate for any wear in the brake band 23. This therefore permits the operator of the vehicle to adjust the brake mechanism by the simple expedient of turning the nut 53 which is located within the driver's compartment within easy reach of the driver while seated on seat 9. The present practice of crawling underneath the vehicle to adjust the brake band 23 is thus eliminated.

A single-pole, double-throw-type electric switch 59 is secured, by means of a bracket 60 and bolts 61, to the wheel housing 13, adjacent the bracket 33. The switch 59 has a manually-actuated, spring-returned plunger 63 therein, which projects outwardly through the switch housing 64. A spring steel finger 65 is rigidly secured to the switch housing 64, below the plunger 63, and the upper end of the finger is adapted to be sprung inwardly to contact and actuate the plunger 63.

A cam member 67 is pivotally connected to the bracket 33 by means of the bolt 35, which also pivotally mounts the hand lever 11 thereon. The cam member 67 is rigidly connected to the hand lever 11 by means of a bolt 69, which is disposed forwardly of the bolt 35. An offset vertical leg portion 71, is formed on the lower end of the cam member 67, as can be seen in Figs. 4 and 5, which, upon an upward movement of the hand lever 11, engages and forces inwardly the upper end of the spring finger 65, so as to actuate the switch plunger 63. The cam member 67 is also formed with a top plate or cover portion 73, which, when the lever 11 is in its normal released position, is disposed in a horizontal plane, above the switch 59. This cover portion 73 thus acts to protect the switch 59 and the spring finger 65, from being damaged. Therefore, when the hand lever 11 is moved from its normal down position to its up position, so as to apply the brake, the switch plunger 63 is actuated to perform a function which will be described below.

The principal components of the electrical circuits for the headlights 27 and parking lights 29, of the vehicle, are illustrated in diagrammatic form in Fig. 6. As can be seen therein, one terminal of the vehicle battery 75 is grounded at 77 and the other terminal is connected to a single-pole, double-throw, manually operated switch 81. The switch 81 is shown in an open position, but it may be closed by the operator of the vehicle, in a conventional manner, to close the circuit either through a line 83 in the headlight circuit or a line 85 in the parking light circuit. The switch 59, previously described, is connected in the line 83, between the lights and the switch 81, and is adapted when in its normal, released position to close the line 83, as illustrated in Fig. 6. However, when the plunger 63 is actuated by the upward movement of the brake lever 11, switch 59 opens line 83 and completes a circuit through a line 87 to the parking light 29.

A single-pole, double-throw, manually operated switch 89 is connected in the line 83 between the headlights and the switch 59, and it is adapted to be actuated, in a conventional manner such as by foot lever, to close a circuit either through a line 91 to the bright filaments 95 of the headlights 27, or through a line 97 to the dim filaments 99 of the headlights.

When the vehicle is being operated at night, the switch 81 will normally be positioned so as to close the line 83, to either the bright or dim filaments of the headlights 27. When the vehicle is stopped by the operator, the hand-brake lever 11 pulled upwardly, the switch 59 will be thrown so as to close the circuit through the line 87 to the parking lights 29, and break the circuit to the headlights 27. Therefore, when the vehicle is parked, with the brake applied, the headlights will be off and the parking lights will be on. When the operator returns to the vehicle, after making a delivery, and releases the hand brake 11, the plunger 63 will be returned, by its spring, to its normal position so as to close line 83 to the headlights 27, and break the circuit through the line 87 to the parking lights 29. Thus when the brake is released, in order to drive the vehicle, the headlights will once again be on and the parking lights will be off. In this way the battery 79 will not be run down, as normally occurs with trucks of this nature at the present time, the life of the battery will be lengthened immensely, and a smaller and less expensive generator will be required than in conventional constructions to maintain the battery in charged condition.

I claim:

1. A lever structure for operating a vehicle brake, said lever structure comprising a cable one end of which is adapted to be connected to said brake, a screw having an elongated threaded shank portion and a cylindrical head portion which is of slightly larger diameter than said shank portion and having an axially inwardly extending recess in which is anchored the other end of said cable, a lever arm adapted to be pivotally mounted on the vehicle for movement about a fixed axis, a connector pin rotatably mounted in said arm and extending generally parallel and in spaced relation to said axis, said pin having an aperture extending transversely thereof at one side of said arm and through which said cable extends, and a wing nut having an internally threaded portion adjacent one end adapted to threadedly engage the threaded shank of said screw and an elongated smooth bore portion intermediate said threaded portion and its other end slidably fitting said cylindrical head of said screw, said other end of said nut engaging one side of said pin at one end of the aperture transversely thereof.

2. A lever structure for operating a vehicle brake, said lever structure comprising a cable one end of which is adapted to be connected to said brake, a screw having an elongated threaded shank portion and a cylindrical head portion which is of slightly larger diameter than said shank portion, said head portion being anchored to the other end of said cable, a lever arm adapted to be pivotally mounted on the vehicle and having a transversely apertured element receiving said cable therethrough, and a wing nut having an internally threaded portion adjacent one end adapted to threadedly engage the threaded shank of said screw and an elongated smooth bore portion intermediate said threaded portion and its other end slidably fitting said cylindrical head of said screw, said other end of said nut engaging one side of said element at one end of the aperture transversely thereof.

CHARLES J. COOK.

REFERENCES CITED

The following references are of record in the file of this patent:

UNITED STATES PATENTS

| Number | Name | Date |
| --- | --- | --- |
| 1,536,366 | Wiseman | May 5, 1925 |
| 1,723,389 | Thiel | Aug. 6, 1929 |
| 1,853,504 | Butler | Apr. 12, 1932 |
| 2,041,268 | Sewell | May 19, 1936 |
| 2,063,729 | Dykstra | Dec. 8, 1936 |
| 2,066,267 | Hayes | Dec. 29, 1936 |
| 2,229,857 | Lucker | Jan. 28, 1941 |
| 2,249,220 | McCann | July 15, 1941 |
| 2,288,169 | McCarthy | June 30, 1942 |

FOREIGN PATENTS

| Number | Country | Date |
| --- | --- | --- |
| 589,293 | France | May 26, 1925 |